US007287141B2

(12) United States Patent
Nakazawa et al.

(10) Patent No.: US 7,287,141 B2
(45) Date of Patent: Oct. 23, 2007

(54) APPARATUS AND METHOD FOR BOOTING A SYSTEM

(75) Inventors: Hidehiko Nakazawa, Nagoya (JP); Akikazu Murata, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 392 days.

(21) Appl. No.: 11/086,571

(22) Filed: Mar. 23, 2005

(65) Prior Publication Data
US 2005/0216689 A1    Sep. 29, 2005

(30) Foreign Application Priority Data
Mar. 23, 2004    (JP)    ............... 2004-084851

(51) Int. Cl.
*G06F 12/00*    (2006.01)
(52) U.S. Cl. .................................... 711/165
(58) Field of Classification Search ................ 711/162, 711/165; 713/2
See application file for complete search history.

(56) References Cited

U.S. PATENT DOCUMENTS 5,737,762 A * 4/1998 Hattori ....................... 711/165

6,697,686 B1    2/2004 Culca et al.

FOREIGN PATENT DOCUMENTS

JP    2001-512258    8/2001

OTHER PUBLICATIONS esp@cenet Family List of W09906895 searched on Nov. 29, 2004.

* cited by examiner

*Primary Examiner*—Hiep T. Nguyen
(74) *Attorney, Agent, or Firm*—Banner & Witcoff, Ltd (57) ABSTRACT

A data volume of a data transferred from a ROM to a RAM corresponds to a data volume specified by a data volume information included in a program data. By setting the data volume specified by the data volume information as the data volume of the program data to be transferred, only the program data having the data volume specified by the data volume information can be transferred from the ROM to the RAM. Therefore, an excessive data transfer may not be performed, and the time required for booting a system may not be increased. Also, only by changing the data volume specified by the data volume information, the data volume of the data to be transferred to the RAM can be arbitrarily changed. Therefore, the flexibility to create a program or a program for upgrade is expanded, and a burden imposed on a creator is reduced.

21 Claims, 6 Drawing Sheets

APPARATUS AND METHOD FOR BOOTING A SYSTEM

CROSS-REFERENCE TO RELATED APPLICATIONS

This application claims the benefit of Japanese Patent Application NO. 2004-084851 filed Mar. 23, 2004 in the Japanese Patent Office, the disclosure of which is incorporated herein by reference.

BACKGROUND

The present invention relates to an apparatus and a method for booting a system in which operation of a CPU is started based on a program.

As a system boot apparatus which boots a system by starting operation of a CPU based on a boot program, there has been conventionally known a system boot apparatus which starts operation of the CPU by access to a ROM in which the boot program is stored. However, there has been recently proposed an apparatus (circuit apparatus) which transfers a program (user program) stored in the ROM (separate memory unit) to a RAM (internal volatile memory) and starts operation of the CPU by access to the program thus transferred to the RAM (for example, see Published Japanese translation of PCT international publication for patent application No. 2001-512258, paragraph 0015).

The transfer speed (access speed) of the RAM is generally faster than that of the ROM. Therefore, by starting operation of the CPU using the program transferred to the RAM as described above, the time required for system boot can be reduced.

SUMMARY

In the system boot apparatus as described above, a program starts to be transferred from the ROM to the RAM when a predetermined direction is inputted from outside (see Published Japanese Translation of PCT International Publication for Patent Application No. 2001-512258, paragraph 0018, etc). In this case, the apparatus is configured so that a transfer volume of the program has to be previously set and a data corresponding to the transfer volume has to be transferred as the program.

According to such a configuration, it is preferable that the transfer volume is set as large as possible. However, if the transfer volume is set larger than the actual data volume of the program, an excessive data is always transferred upon transfer of the program. Consequently, the time required for system boot is increased.

Therefore, in the above system boot apparatus, the transfer volume is generally not set as large as possible. Instead, the transfer volume is previously set as a volume which corresponds to the actual data volume of the program.

However, if configured as above, even in the case where the program is upgraded, the data volume of the program has to be constant before and after the upgrade of the program. If the data volume of the program is increased due to the upgrade, a part of the program can not be transferred to the RAM. Consequently, the system boot may not be performed properly.

Restriction of the data volume as above becomes a burden to a program creator who creates a program, or a program for upgrade. In some cases, the program may not be upgraded due to the restriction.

One object of the present invention is to provide a technique in which an excessive data may not be transferred upon transfer of a program and upgrade of the program may be performed without restriction.

To attain the above and other objects, in one aspect of the invention, there is provided a system boot apparatus which comprises a transfer device that transfers at least a part of a program data stored in a ROM to a RAM. Operation of a CPU is started based on a program represented by the program data transferred to the RAM by the transfer device. A data volume information for specifying a data volume of the program data transferred from the ROM to the RAM by the transfer device is included in the program data stored in the ROM. The transfer device transfers at least a part of the program data stored in the ROM to a storage area of the RAM in accordance with the data volume specified by the data volume information included in the program data.

According to the system boot apparatus configured as above, the data having the data volume specified by the data volume information can be transferred from the ROM to the RAM as the program data to be transferred to the RAM. Therefore, no matter what the data volume of the program data to be transferred to the RAM is, the data volume of the program data may be set as the data volume of the data to be transferred from the ROM to the RAM.

That is, by setting the data volume indicated by the data volume information as the data volume of the program data to be transferred to the RAM, only the program data having the appropriate data volume specified by the data volume information can be transferred from the ROM to the RAM. Thus, an excessive data transfer may not be performed upon booting a system, and a minimum required data transfer may be performed. Consequently, the time required for system boot may not be increased.

Furthermore, only by changing the data volume indicated by the data volume information, the data volume of the data to be transferred from the ROM to the RAM can be arbitrarily changed, Therefore, the flexibility to create a program or a program for upgrade is expanded, and the burden imposed on a creator for creating the same can be reduced.

In another aspect of the invention, the data volume information may include information for specifying a data volume of a data corresponding to the program included in the program data.

On the other hand, in a further aspect of the invention, a system boot method comprises: a transfer step in which at least a part of a program data stored in a ROM is transferred to a RAM; and a booting step in which operation of a CPU is started based on a program represented by the program data transferred to the RAM in the transfer step. A data volume information for specifying a data volume of the program data transferred from the ROM to the RAM in the transfer step is included in the program data stored in the ROM. In the transfer step, at least a part of the program data stored in the ROM is transferred to a storage area of the RAM in accordance with the data volume specified by the data volume information included in the program data.

BRIEF DESCRIPTION OF THE DRAWINGS

The present invention will now be described, by way of example, with reference to the accompanying drawings, in which.

DETAILED DESCRIPTION OF THE PREFERRED EMBODIMENT

The preferred embodiment, in which a system boot apparatus of an embodiment according to the present invention is mounted on a main body apparatus (system) such as a printer, copy machine, scanner or the like, will be described below with reference to drawings.

Figure 1:
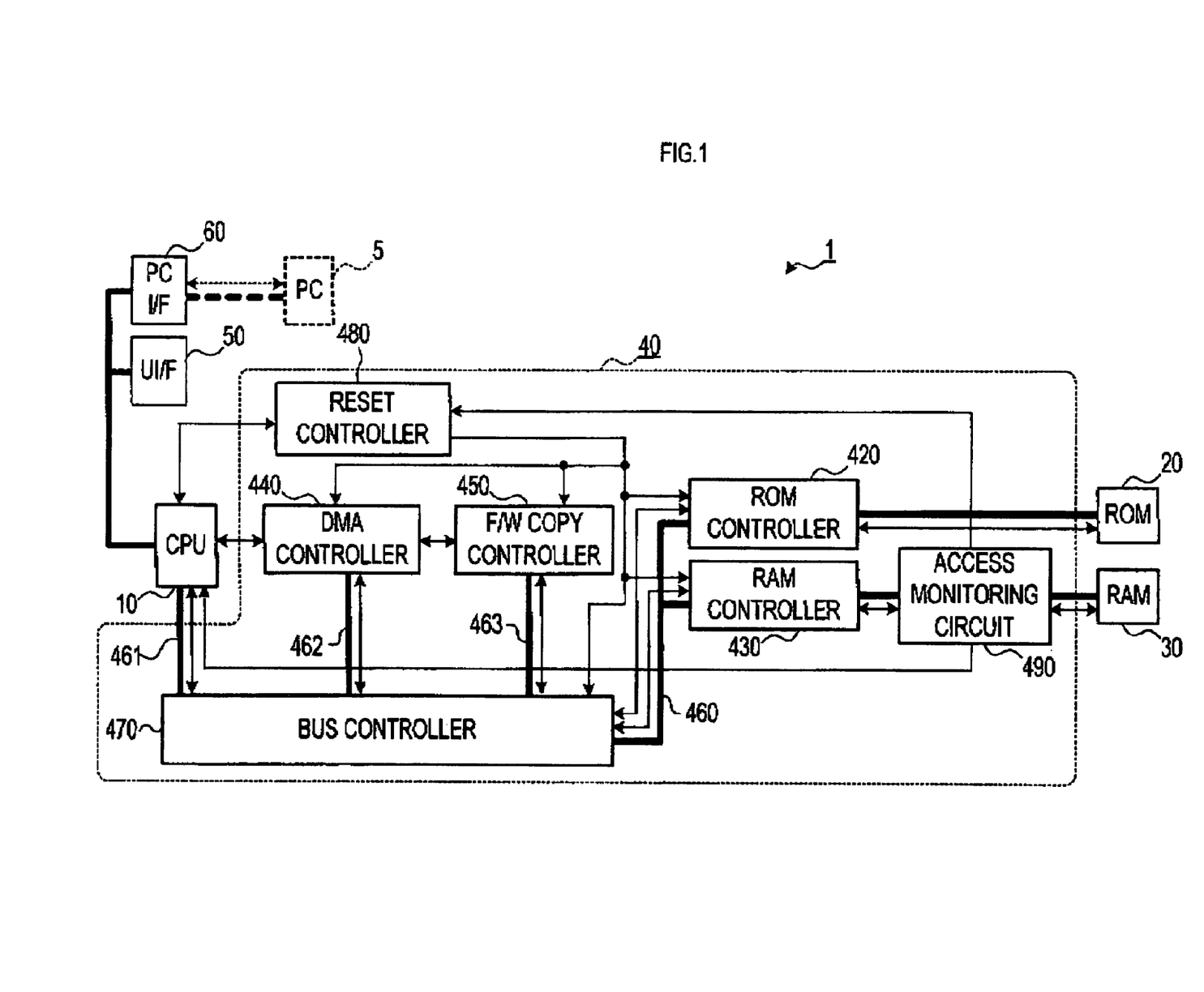
FIG. 1 is a block diagram of a configuration of a main body device on which a system boot apparatus of an embodiment according to the invention is mounted.

A main body device 1 comprises a CPU 10, a ROM 20, a RAM 30, a system controller 40, a user interface unit (hereinafter, referred to as UI/F) 50, a PC interface unit (hereinafter, referred to as PCI/F) 60, in addition to the elements (not shown) that realizes functions of the main body device 1. The CPU 10, the ROM 20, and the RAM 30 are connected with each other through the system controller 40 so as to implement a data communication therebetween.

The ROM 20 is a non-volatile memory which can be electrically overwritten (the ROM 20 is an EEPROM (Electrically Erasable Programmable Read-Only Memory) in the present embodiment). The ROM 20 is configured to input/output data using a serial transmission technique. A program data functioning as a boot program for booting a system of the main body device 1 is stored in the ROM 20.

A data area of the program data comprises a data area of a data volume information indicating a data volume of a program data to be transferred from the ROM 20 to the RAM 30, a data area corresponding to a program for executing only a minimum required process for booting the main body device 1, and a data area corresponding to a program for executing other processes. The data volume information indicates only the data volume of the data area corresponding to the program other than the data volume of the data area of the data volume information.

Figure 2A:
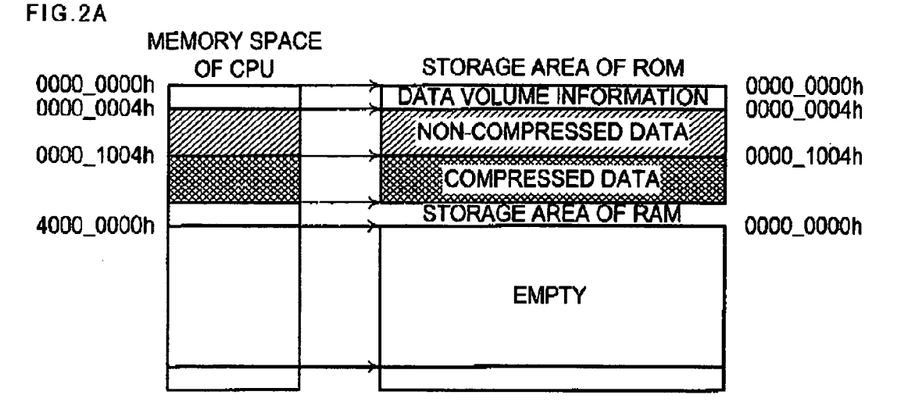
FIGS. 2A, 2B, and 2C show mapping states in which a memory space of a CPU is associated with a storage area of each of a ROM and a RAM.

In the present embodiment, as illustrated in FIG. 2A, among the elements of the program data, a data corresponding to the program for executing only a minimum required process for booting the main body device 1, is configured as a non-compressed data, in which a data volume is not compressed. In the program data, a data corresponding to the program for executing the other processes is configured as a compressed data, in which a data volume is compressed. Furthermore, a data functioning as the data volume information includes information by which the data volume of the non-compressed data is specified, Therefore, in the present embodiment, the data volume information includes information for specifying the data volume of the data functioning as the program for booting the main body device 1 by starting operation of the CPU 10.

In the present embodiment, a process to convert the compressed data to a data (decompressed data) by decompressing (expanding), is performed based on the program represented by the non-compressed data, as described below.

In an initial state, a mapping is performed by the bus controller 470 so that a storage area of each of the ROM 20 and the RAM 30 is associated with an area in the memory space of the CPU 10. Specifically, in the initial state of the mapping, the area starting from the address "0000_0000h" in the memory space of the CPU 10 in FIG. 2A is associated with the storage area of the ROM 20. The area starting from the address "4000_0000h" in the memory space of the CPU 10 in FIG. 2A is associated with the storage area of the RAM 30. Data can be read out from or written in one of the ROM 20 and the RAM 30, by access from the CPU 10 to the address of one of the ROM 20 and the RAM 30.

The system controller 40 comprises: a ROM controller 420 which controls operation of the ROM 20; a RAM controller 430 which controls operation of the RAM 30; a DMA (Direct Memory Access) controller 440 which performs data transfer from the ROM 20 to the RAM 30; a F/W (Firmware) copy controller 450 which directs the data transfer performed by the DMA controller 440; a bus controller 470 which mediates access demands from the DMA controller 440, the F/W copy controller 450, and the CPU 10, to one of the ROM 20 and the RAM 30; a bus 460 which connects the bus controller 470 with one of the ROM controller 420 and the RAM controller 430; a bus 461 which connects the bus controller 470 with the CPU 10; a bus 462 which connects the bus controller 470 with the DMA controller 440; a bus 463 which connects the bus controller 470 with the F/W copy controller 450; a reset controller 480 which outputs a reset signal to each of the above controllers and the CPU 10; and an access monitoring circuit 490 which monitors access to the RAM 30 via the RAM controller 430.

The UI/F 50 comprises an operation panel which receives operation from a user, and a display panel which displays information with respect to the main body device 1.

The PCI/F 60 is an interface (USB interface, etc) which performs data communication with a host device (ex. personal computer (hereinafter, referred to as PC) 5 in FIG. 1) based on a certain standard.

In the present embodiment, the system controller 40 and the CPU 10 are integrally constituted as an ASIC (Application Specific Integrated Circuit) including a CPU core, However, only the system controller 40 may be constituted as an ASIC. The PCI/F 60 or the like may be included in an ASIC.

[System Booting Procedure]

A system booting procedure performed in the main body device 1 configured as above will be described with reference to FIG. 3. The system booting procedure is performed when the power of the main body device 1 is turned on. The main body device 1 executes a control operation of the system booting procedure as a so-called hardware circuit. However, in order to facilitate understanding, the control operation as a hardware circuit is replaced with a flowchart in the following description.

First of all, the reset controller 480 resets each block (S110). Specifically, reset signals ("H" level signals) are respectively outputted to the CPU 10, the ROM controller 420, the RAM controller 430, the DMA controller 440, the F/W copy controller 450, and the bus controller 470, so as to reset each of the blocks.

Next, reset of the blocks except the CPU 10 is released (S120). Specifically, output of the reset signals to the controllers (blocks) except the CPU 10 among the blocks to which the reset signals have been outputted in S110, is terminated (by making the reset signals at "L" level), so that the reset of the blocks except the CPU 10 is released.

After the reset of the blocks is released in S120, the F/W copy controller 450 reads the data (data volume information) stored in a top address of the storage area of the ROM 20

(S130) The data volume information read out here indicates a data volume "A" byte corresponding to a data volume of the non-compressed data in the program data. The non-compressed data is written in the RAM 30 in the following process.

The F/W copy controller 450 directs the DMA controller 440 to transfer (copy) the data in the storage area of the ROM 20, having the data volume "A" byte which has been read in S130, from the address after the data volume information to the RAM 30 (S140).

Figure 2B:
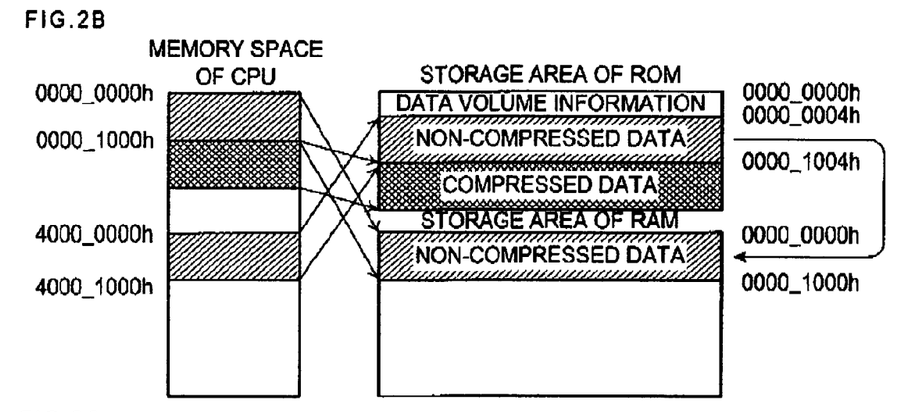

The DMA controller 440, which has received this direction, starts transferring the data having the data volume "A" byte, from the address right after the address of the data volume information stored in the ROM 20, to the RAM 30 (S150, S160: NO). After the data transfer is finished (S160: YES), the DMA controller 440 outputs a signal for notifying the end of the data transfer to the F/W copy controller 450 (S170). In the initial state (before the procedure from S150 to S170), no data has been store in the RAM 30 (see FIG. 2A). But after the procedure from S150 to S170, the non-compressed data in the program data stored in the ROM 20, corresponding to the program for executing only the aforementioned minimum required process, is transferred and stored in the RAM 30 by the DMA controller 440 (see FIG. 2B).

The F/W copy controller 450 directs the bus controller 470 to perform re-mapping so that the area in the memory space of the CPU 10 is associated with the storage area of each of the ROM 20 and RAM 30 (S180).

The bus controller 470, which has received this direction, performs re-mapping so that the area in the memory space of the CPU 10 is associated with the storage area of each of the ROM 20 and the RAM 30 (S190). In this case, a mapping is performed so that the information corresponding to the address of the non-compressed data, transferred to the RAM 30 in S150 and S160, is placed in the address in the memory space of the CPU 10 where the CPU 10 firstly accesses when the reset is released (the top address "0000_0000h" in the memory space of the CPU 10 in the present embodiment) in the following procedure.

Specifically, the area in the memory space of the CPU 10 (the area starting from the address "0000_0004h"), which was associated with the storage area of the non-compressed data in the ROM 20 in the initial state (see FIG. 2A), is associated with the storage area of the non-compressed data in the RAM 30. Also, the area in the memory space of the CPU 10 (the area starting from the address "4000_0000h"), which was associated with the storage area of the non-compressed data in the RAM 30 before this process, is associated with the storage area of the non-compressed data in the ROM 20. Then, the arrangement of the area in the memory space of the CPU 10 (i.e. the area starting from the address "0000_0004h"), which was associated with the storage area of the non-compressed data in the RAM 30, and the area in the memory space of the CPU 10, which was associated with the storage area of the compressed data in the ROM 20, is shifted toward the top address in the memory space of the CPU 10 by the amount corresponding to the address of the data volume information (see FIG. 2B). The bus controller 470 performs a mapping so as not to perform a mapping with respect to the storage area of the data volume information. That is, a mapping is performed so that the arrangement of the addresses of the non-compressed data and the compressed data is shifted toward the top address within the memory space of the CPU 10 by the amount corresponding to the address of the data volume information.

The reset controller 480 releases the reset of the CPU 10 (S200). Specifically, output of the reset signal to the CPU 10 is terminated (by making the reset signal at "L" level).

After the reset of the CPU 10 is released, the CPU 10 accesses the top address of the storage area of the RAM 30. Then, operation of the CPU 10 is started based on the program (software), which is represented by the non-compressed data transferred to the RAM 30 in S150 and S160 (S210). Right after the reset release in S200, the content of an internal program counter inside the CPU 10 is "0". Thus, the CPU 10 accesses the top address of the RAM 30 which is the address indicated by the internal program counter. The non-compressed data includes a data functioning as a program which performs access to the compressed data stored in the ROM 20, decompression of the compressed data to obtain a decompressed data, and storage of the decompressed data into the RAM 30. These processes are performed right after the program represented by the non-compressed data is booted.

Therefore, the CPU 10, which is started based on the program, reads out the compressed data from the ROM 20, decompresses the compressed data so as to convert the compressed data to the decompressed data, and stores the decompressed data in the RAM 30 (S220).

Figure 2C:
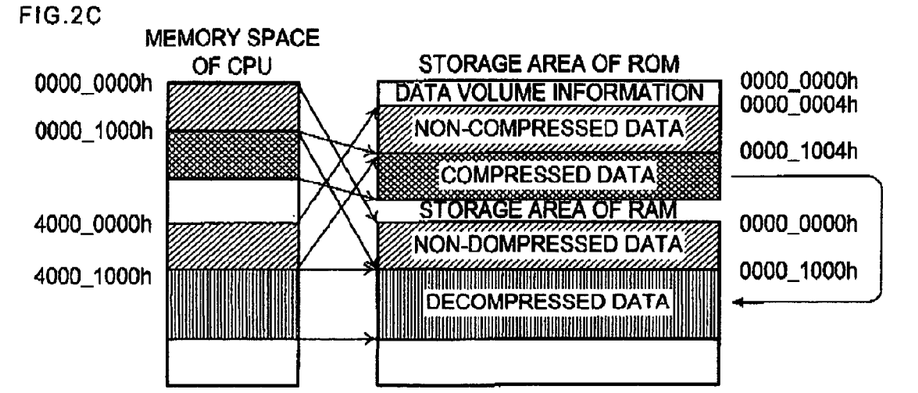

In S220, the decompressed data of the compressed data corresponding to the program for performing the aforementioned other processes in the program data is stored in the RAM 30 by a function of the software booted by the CPU 10 (see FIG. 2C). Consequently, the entire data except the data volume information in the program data, that is, a boot program for the main body device 1, is written in the RAM 30.

[Access Monitoring]

In the present embodiment, the CPU 10 executes the boot program stored in the RAM 30. However, the content of the RAM 30 is easily overwritten by the access from the outside. If overwriting of the data of the boot program stored in the RAM 30 is executed by an unauthorized access from the outside, the program represented by the overwritten data is executed by the CPU 10. Consequently, the main body device 1 may be operated abnormally. However, in the present embodiment in which the system is booted through the aforementioned system booting procedure, the unauthorized access to the RAM 30 is monitored by the access monitoring circuit 490. A procedure of the access monitoring will be described with reference to FIG. 4.

Figure 4:
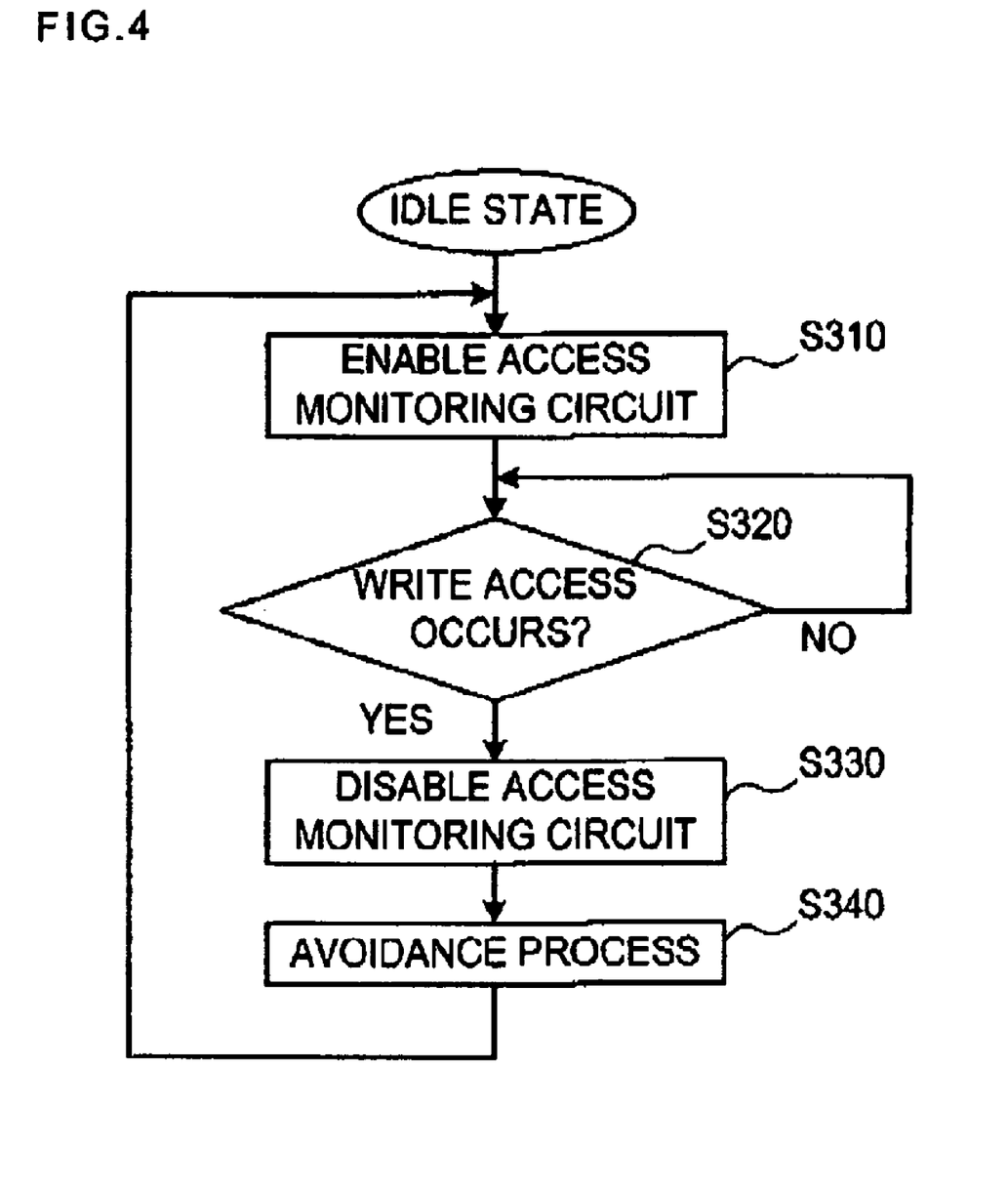
FIG. 4 is a flow chart showing a access monitoring procedure.

First, the access monitoring circuit 490 is enabled (operation state) (S310).

Specifically, for example, when the process of S220 is finished, by transmitting a certain signal from the CPU 10 to the access monitoring circuit 490, or detecting the end of the process of S220 at the access monitoring circuit 490, the access monitoring circuit 490 is enabled (operation state).

Thus by enabling the access monitoring circuit 490, the access monitoring circuit 490 starts monitoring whether or not the unauthorized access to the RAM 30 occurs. In the present embodiment, the access monitoring circuit 490 detects the unauthorized writing of the boot program, if the access monitoring circuit 490 detects the access (write access) to store the data in the storage area (program area) in which the boot program is stored.

Then, whether or not the write access occurs to the program area is monitored by the access monitoring circuit 490 (S320: NO). If the write access is detected (S320; YES), the access monitoring circuit 490 is disabled (stopped state) (S330). Specifically, for example, if the access monitoring circuit 490 detects occurrence of the write access, the access monitoring circuit 490 makes itself disabled (stopped state). Once the access monitoring circuit 490 is disabled, rewriting of the boot program is not effectively performed on the RAM 30.

After an avoidance process is performed (S340), the procedure returns to SS10. Specifically, the access monitoring circuit 490 notifies the CPU 10 of occurrence of the unauthorized rewriting of the boot program by outputting an interrupt data. The CPU 10, which has obtained the interrupt data, forcibly terminates execution of the process of the boot program. After outputting the interrupt data, the access monitoring circuit 490 outputs a direction to the reset controller 480 so that the reset controller 480 performs reset. The reset controller 480, which has obtained this direction, performs a procedure in the same manner as in 510 in FIG. 8. The boot program in the RAM 30 is rewritten through the same procedures as those of S120 to S220. Thus, the boot program is correctly rewritten, and the main body device 1 is re-booted properly.

[Upgrade of the Boot Program]

In the present embodiment, after the system is booted through the aforementioned system booting procedure, in order to correct inconvenience or add an additional function for the operation of the main body device 1, the process for upgrading the boot program itself (rewriting to a modified version of the boot program) may be performed as one of the processes performed based on the boot program in accordance with necessity. The upgrade process executed by the CPU 10 will be described with reference to FIG. 5.

Figure 5:
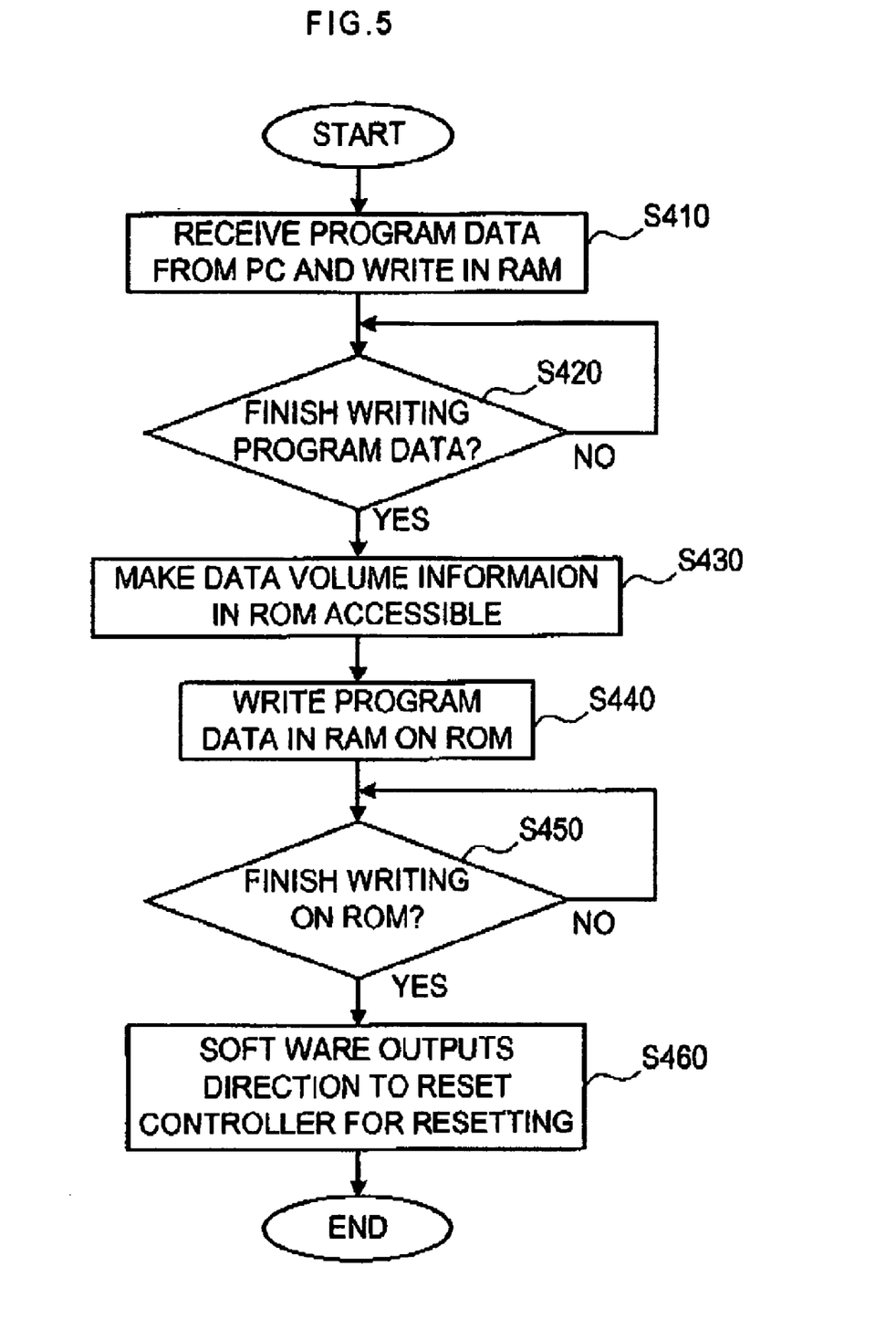
FIG. 5 is a flow chart showing a procedure of an upgrade process.

The upgrade process is started when a modified version of the program data is received from the PC 5 connected via the PCI/F 60. The modified version of the program data is sent by a function of an application soft installed in the PC 5. The modified version of the program data comprises a compressed data, a non-compressed date, and a data volume information in the same manner as the program data before modified. The data volume information indicates the total data volume of the non-compressed data. In order to reduce the transfer time from the PC 5, the entire program data may be received as a compressed data and decompressed in the main body device 190 as to obtain the program data configured as above.

Figure 6:
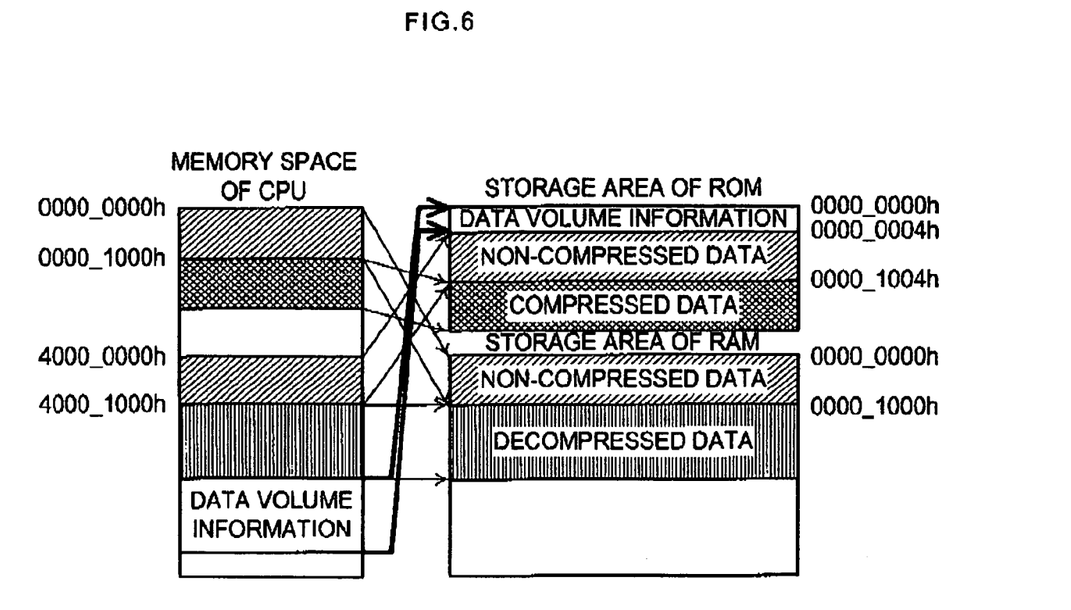
FIG. 6 shows a mapping state in which the memory space of the CPU is associated with the storage area of each of the ROM and the RAM at the time of the upgrade process.

First, writing of the program data received from the PC 5 to the RAM 30 is started (S410, S420; NO). After the writing is finished (S420: YES), a state is realized so that the CPU 10 can access the storage area of the data volume information in the ROM 20 (S430). After the system is booted through the system booting procedure as above (FIG. 3), with respect to the storage area of the data volume information in the ROM 20, a mapping is not performed by the bus controller 470. Consequently, the CPU 10 can not access the storage area of the data volume information in this state. In this state, rewriting of the data volume information stored in the ROM 20 can not be performed as a part of the upgrade process. Therefore, in S480, the bus controller 470 is requested to perform a mapping with respect to the storage area of the data volume information in the ROM 20 so that the CPU 10 can access this storage area. In the present embodiment, the bus controller 470 performs a mapping so that an available address in the memory space of the CPU 10 is associated with the address corresponding to the storage area of the data volume information in the ROM 20 (4 bytes from the top address of the ROM 20). In FIG. 6, the description of the modified version of the program data, which is written in the RAM 30 in S410 and S420, is omitted.

Thus, after the state is realized so that the CPU 10 can access the storage area of the data volume information in the ROM 20, writing of the program data written in the RAM 30 in S410 and S420 to the ROM 20, is started (S440, S450: NO). After the writing is finished (S450: YES), a direction is outputted to the reset controller 480 so that the reset controller 480 performs reset (S460). Then, the upgrade process is terminated, In S440 and S450, the writing of the program data is made from the top address of the storage area in the ROM 20 in order of the data volume information, the non-compressed data, and the compressed data.

Specifically, the processes of S440 and S450 are, for example, executed as follows. That is, the storage area of the RAM 30 for each element of the program data (the data volume information, the non-compressed data, and the compressed data) written in the RAM 30 in S410 and S420, and the area in the memory space of the CPU 10 (an available area within the area starting from the address "4000_0000h") are associated with each other after the processes of S410 and S420. In S440 and S450, based on the association as above, the CPU 10 accesses and reads the program data for upgrade in the RAM 30. The CPU 10 writes the data volume information included in the program data for upgrade read from the RAM 30, on the storage area of the data volume information in the ROM 20, to which access is made possible in S430. Also, based on the information with respect to the association between the area in the memory space of the CPU 10 and the storage area of the ROM 20 configured by the process of S190, the CPU 10 sequentially writes the non-compressed data and the compressed data included in the program data for upgrade, on the storage area right after the storage area of the data volume information in the ROM 20.

The reset controller 480, which has obtained the direction outputted in S460, performs a process in the same manner as in S110 in FIG. 8. The boot program in the RAM 30 is rewritten through the same procedures as those of S120 to S220. Thus, the boot program is upgraded, and the main body device 1 is re-booted.

[Effect]

According to the main body device 1 configured as above, the data having the data volume specified by the data volume information can be transferred from the ROM 20 to the RAM 30 as the program data to be transferred to the RAM 30. Therefore, no matter what the data volume of the program data to be transferred to the RAM 30 is, the data volume of the program data specified by the data volume information may be set as the data volume of the data to be transferred from the ROM 20 to the RAM 30.

That is, by setting the data volume indicated by the data volume information as the data volume of the program data to be transferred to the RAM 30, only the data, functioning as the program to execute only a minimum required process for booting the main body device 1, can be transferred from the ROM 20 to the RAM 30. Thus, upon booting the system, an excessive data transfer is not performed, and the minimum required data transfer is performed from the ROM 20 to the RAM 30. Therefore, the time required for data transfer and system booting is relatively decreased.

Furthermore, only by changing the data volume indicated by the data volume information, the data volume of the data to be transferred from the ROM 20 to the RAM 30 can be arbitrarily changed. Therefore, the flexibility to create a program or a program for upgrade is expanded, and the burden imposed on a creator can be reduced.

Figure 3:
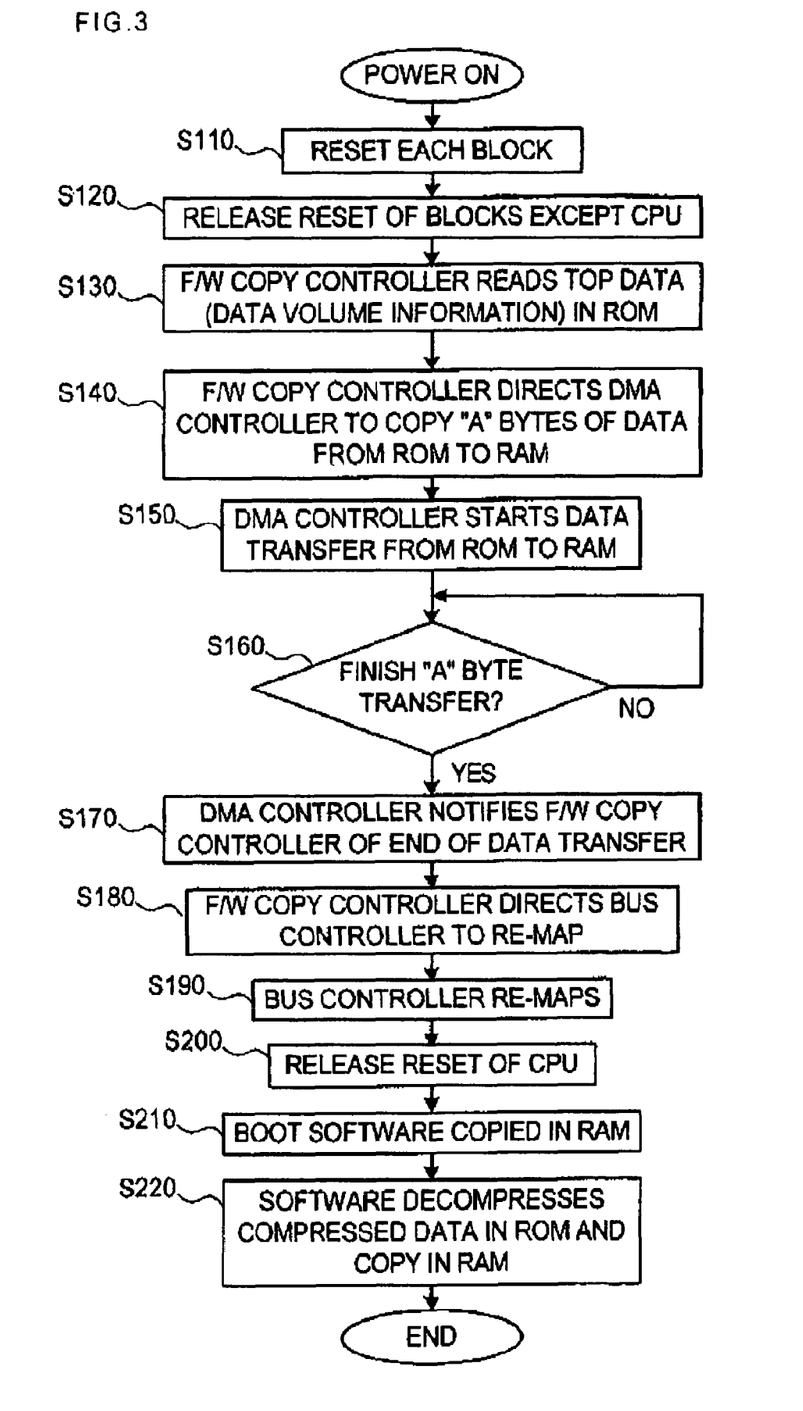
FIG. 3 is a flow chart showing a system booting procedure.

In the system booting procedure shown in FIG. 3, the data corresponding to the data volume information in the program data stored in the ROM 20 is not transferred to the RAM 30. Only the data corresponding to the program (the compressed data (specifically, the decompressed data which is made by decompression of the compressed data) and the non-compressed data) is transferred to the RAM 30. The data corresponding to the data volume information is unnecessary for the CPU 10 to execute the program. Therefore, by not transferring such an unnecessary data, the time required for transfer of the program data to the RAM 30 can be reduced.

In the process of S220 in FIG. 3, the CPU 10 decompresses the compressed data stored in the ROM to obtain the decompressed data, and transfers the decompressed data to the RAM 30, based on the program represented by the non-compressed data transferred to the RAM 30 by the DMA controller 440. Therefore, the data, functioning as the program to be executed by the CPU 10, can be stored in the ROM 20 in the state in which the data volume of the program data is compressed and reduced compared to a normal data volume of the program data.

In the process of S190 in FIG. 3, the memory space of the CPU 10 is associated with the program data in the ROM 20 and the RAM 30. However, in this case, the memory space of the CPU 10 is not associated with the data corresponding to the data volume information.

As described above, the data volume information included in the program data is unnecessary for the CPU 10 to execute the program. Therefore, when the program represented by the program data is designed under the condition where a part of the memory space of the CPU 10 is associated with the data area corresponding to the data volume information, existence of the data area corresponding to the data volume information in the memory space of the CPU 10 has to be taken into account. For example, the specification of an area in the memory space of the CPU 10 should be performed by avoiding the specification of the data area of the data volume information during the execution of the program.

Specifically, for example, in the case where a mapping is performed so that the area starting from the top address in the memory space of the CPU 10 is associated with the data area of the data volume information in the ROM 20, in order to access a data other than the data volume information stored in the ROM 20, the address of the data, which is shifted by the amount of the address corresponding to the data area of the data volume information, should be specified in the process during program execution. This only makes a program design complicated and is not favorable.

In contrast, if it is configured so that the memory space of the CPU 10 is not associated with the data area corresponding to the data volume information as in the aforementioned process of S190, when the program represented by the program data is designed, it is not necessary to consider the existence of the data area corresponding to the data volume information. Therefore, the program represented by the program data can be designed easily.

In the case where a mapping is not performed with respect to the data area corresponding to the data volume information as described above, when the program data is upgraded, rewriting of the data volume information can not be performed. However, in the present embodiment, after the system of the main body device 1 is booted, on condition that the modified program data is received through the PCI/F 60, mapping is performed with respect to the data volume information in S430 in FIG. 5. Consequently, the CPU 10 can access the data volume information in the ROM 20. By satisfying the above condition, rewriting of the data volume information can be performed.

After the system is booted, whether or not the unauthorized access to the RAM 30 occurs is monitored by the access monitoring circuit 490. When occurrence of the unauthorized access is detected, the avoidance process, which prevents the process based on the unauthorized access from being executed by the CPU 10, is performed. In this avoidance process, the execution of the boot program by the CPU 10 is forcibly terminated. Therefore, even if rewriting of the program data is performed by the unauthorized access from the outside, the abnormal operation of the main body device can be avoided.

Also, in the avoidance process, rewriting of the program data and re-booting of the boot program is performed through the same procedure as in S110 to S220 in FIG. 3. Therefore, even if rewriting of the program data is performed by the unauthorized access from the outside, the boot program is re-booted in the state in which the normal program data stored in the ROM 20 is re-transferred to the RAM 30. Therefore, the abnormal operation of the main body device 1 can be avoided. Furthermore, the main body device 1 is restored to a state in which the main body device 1 can be operated by the normal boot program.

The ROM 20 is configured to input/output data using a serial transmission technique. Therefore, the mounting area of the ROM 20 can be relatively reduced. Furthermore, compared to the ROM which inputs/outputs data using a parallel transmission technique, the number of the input/output terminals can be reduced.

[Modified Example]

The invention is not restricted to the embodiment as described above, and may be practiced or embodied in still other ways without departing from the subject matter thereof.

For example, in the above embodiment, the system controller 40 and the CPU 10 are integrally constituted as an ASIC including a CPU core. However, the system controller 40 and the CPU 10 may be constituted using a PLD (Programmable Logic Device).

In the above embodiment, the ROM 20 is an EEPROM. However, as long as the ROM 20 is a non-volatile memory which can be electrically overwritten, a flash memory or the like may be employed as the ROM 20.

In the above embodiment, the mapping process (the process of S430) in the upgrade process in FIG. 5 is performed on condition that the program data is received through the PCI/F 60. However, with respect to a condition to perform the mapping process (the mapping condition), another mapping condition can be employed. For example, whether a certain operation is performed via the UI/F 50 may be used as a mapping condition.

In S340 in FIG. 4 in the above embodiment, as the avoidance process, the process performed by the boot program is terminated, and the boot program in the RAM 30 is rewritten. However, instead of rewriting the boot program in the RAM 30, a direction to display a message to notify that rewriting of the boot program has been performed by the unauthorized access, may be outputted to the UI/F 50.

In this configuration, even if rewriting of the program data is performed by the unauthorized access from the outside, the notification can be made. Therefore, a user, who has confirmed the notification, may perform an operation to re-transfer the normal program data stored in the ROM 20 to the RAM 30, that is, an operation to re-boot the main body device 1. Consequently, the main body device 1 can be restored to the state in which the main body device 1 can be operated normally.

As the "notification", the display of the message may be made on the operation panel. However, in the case where the main body device 1 comprises a speaker, the message may be outputted by the speaker as an oral message. Alternatively, in the case where the main body device 1 comprises a print engine (image forming function), the message may be printed as a printed message.

Also, as long as the execution of a program by the CPU 10 is avoided, any process may be used as the, avoidance process. For example, the avoidance process may include at least a process to terminate the execution of a program by the CPU 10.

In the above embodiment, the program data comprises the data volume information, the compressed data, and the non-compressed data. In the procedure of S210 and S220 in FIG. 3, the CPU 10 decompresses the compressed data to obtain the decompressed data, and transfers the same. However, the program data may comprise only the data volume information and the non-compressed data. In this case, the CPU 10 does not perform any decompression of the compressed data to transfer the obtained decompressed data as in the system booting procedure in FIG. 3. That is, the procedure of S210 and S220 in FIG. 3 is not performed.

Furthermore, the data volume information included in the program data as a data, may be the information specifying the data volume of the entire program data. In this configuration, for example, by the transfer process executed by the F/W copy controller 450 and the DMA controller 440 (see S130 to S170 in FIG. 3), the entire program data stored in the ROM 20 can be preferably transferred to the RAM 30.

In this case, based on the data volume information, only the entire program data stored in the ROM 20 can be transferred from the ROM 20 to the RAM 30 upon booting the system.

Therefore, in this case, since the data other than the program data stored in the ROM 20 is not transferred, the time required for system booting can be decreased. Also, only by changing the data volume information, the data volume of the program data transferred from the ROM 20 to the RAM 30 can be changed. This will expand flexibility when an upgraded program data is created.

What is claimed is:

1. A system boot apparatus, comprising:
a transfer device that transfers at least a part of a program data stored in a ROM to a RAM,
wherein operation of a CPU is started based on a program represented by a program data transferred to the RAM by the transfer device,
a data volume information for specifying a data volume of the program data transferred from the ROM to the RAM by the transfer device is included in the program data stored in the ROM, and
the transfer device transfers at least a part of the program data stored in the ROM to a storage area of the RAM in accordance with the data volume specified by the data volume information included in the program data.

2. The system boot apparatus according to claim 1,
wherein the data volume information includes information for specifying a data volume of a data corresponding to the program in the program data, and
the transfer device transfers only the data corresponding to the program in the program data stored in the ROM based on the data volume information.

3. The system boot apparatus according to claim 1,
wherein the program data transferred to the RAM by the transfer device includes a data functioning as a program to start operation of the CPU,
the data volume information includes information for specifying a data volume of the data functioning as the program to start operation of the CPU, and
the transfer device transfers the data functioning as the program to start operation of the CPU in the program data based on the data volume information.

4. The system boot apparatus according to claim 1,
wherein, as the data corresponding to the program, the program data includes a compressed data, in which a data volume is compressed, and a non-compressed data, in which a data volume is not compressed,
the data volume information includes information for specifying a data volume of the non-compressed data, and
the transfer device transfers only the non-compressed data in the program data to the RAM based on the data volume information.

5. The system boot apparatus according to claim 4,
wherein the non-compressed data includes a data functioning as a program to direct at least decompression of the compressed data and transfer of an obtained decompressed data to the RAM, and
the CPU executes the program represented by the non-compressed data transferred to the RAM by the transfer device, so that the decompression of the compressed data and the transfer of the obtained decompressed data to the RAM are performed.

6. The system boot apparatus according to claim 1, further comprising:
a mapping device that performs a mapping so that an area in a memory space of the CPU is associated with a data area of each of the ROM and the RAM in association with the transfer of the program data by the transfer device,
wherein, when the mapping is performed so that the area in the memory space of the CPU is associated with the data area of the ROM, the mapping device only performs a mapping so that the area in the memory space of the CPU is associated with a data area of the ROM other than a data area corresponding to the data volume information in the data area of the ROM.

7. The system boot apparatus according to claim 6,
wherein the ROM comprises a non-volatile memory that can be electrically overwritten, and
the mapping device performs a mapping so that an area in the memory space of the CPU is associated with the data area corresponding to the data volume information in the data area of the ROM, when a predetermined mapping condition is satisfied.

8. The system boot apparatus according to claim 1, further comprising:
a monitoring device that monitors access to the storage area of the RAM to which the program data is transferred, after operation of the CPU is started based on the program represented by the program data transferred to the RAM; and
an avoidance device that performs an avoidance process so as to avoid an execution of a process by the CPU based on a written data in the storage area of the RAM to which the program data is transferred, when an access for writing a data in the storage area of the RAM, to which the program data is transferred, is detected by the monitoring device.

9. The system boot apparatus according to claim 8,
wherein, as the avoidance process, the avoidance device terminates an execution of the program by the CPU, makes the transfer device re-transfer the program data to the RAM, and makes the CPU execute the program represented by the re-transferred program data, so as to re-boot a system.

10. The system boot apparatus according to claim 8,
wherein, as the avoidance process, the avoidance device terminates an execution of the program by the CPU, and notifies that the access for writing a data in the storage area or the RAM is detected by the monitoring device.

11. The system boot system according to claim 1,
wherein the ROM is configured as a device that inputs/outputs a data using a serial transmission technique.

12. A system boot method, comprising:
a transfer step in which at least a part of a program data stored in a ROM is transferred to a RAM; and
a booting step in which operation of a CPU is started based on a program represented by the program data transferred to the RAM in the transfer step,
wherein a data volume information for specifying a data volume of the program data transferred from the ROM to the RAM in the transfer step is included in the program data stored in the ROM, and
in the transfer step, at least a part of the program data stored in the ROM is transferred to a storage area of the RAM in accordance with the data volume specified by the data volume information included in the program data.

13. The system boot method according to claim 12,
wherein the data volume information includes information for specifying a data volume of a data corresponding to the program in the program data, and
in the transfer step, only the data corresponding to the program in the program data stored in the ROM is transferred based on the data volume information.

14. The system boot method according to claim 12,
wherein the program data transferred to the RAM in the transfer step includes a data functioning as a program to start operation of the CPU,
the data volume information includes information for specifying a data volume of the data functioning as the program to start operation of the CPU, and
in the transfer step, the data functioning as the program to start operation of the CPU in the program data is transferred based on the data volume information.

15. The system boot method according to claim 12,
wherein, as the data corresponding to the program, the program data includes a compressed data, in which a data volume is compressed, and a non-compressed data, in which a data volume is not compressed,
the data volume information includes information for specifying a data volume of the non-compressed data, and
in the transfer step, only the non-compressed data in the program data is transferred to the RAM based on the data volume information.

16. The system boot method according to claim 15,
wherein the non-compressed data includes a data functioning as a program to direct at least decompression of the compressed data and transfer of an obtained decompressed data to the RAM, and
in the booting step, the CPU is wade to decompress the compressed data and transfer the obtained decompressed data to the RAM based on the program represented by the non-compressed data transferred to the RAM in the transfer step.

17. The system boot method according to claim 12, further comprising;
a mapping step in which a mapping is performed so that an area in a memory space of the CPU is associated with a data area of each of the ROM and the RAM in association with the transfer of the program data in the transfer step,
wherein, in the mapping step, when the mapping is performed so that the area in the memory space of the CPU is associated with the data area of the ROM, only a mapping is performed so that the area in the memory space of the CPU is associated with a data area of the ROM other than a data area corresponding to the data volume information in the data area of the ROM.

18. The system boot method according to claim 17,
wherein, in the mapping step, a mapping is performed so that an area in the memory space of the CPU is associated with the data area corresponding to the data volume information in the data area of the ROM, when a predetermined mapping condition is satisfied.

19. The system boot method according to claim 12, further comprising:
a monitoring step in which access to the storage area of the RAM is monitored, to which the program data is transferred, after operation of the CPU is started in the booting step; and
an avoidance step in which an avoidance process is performed so as to avoid an execution of a process by the CPU based on a written data in the storage area of the RAM to which the program data is transferred, when an access for writing a data in the storage area of the RAM, to which the program data is transferred, is detected, in the monitoring step.

20. The system boot method according to claim 19,
wherein, in the avoidance step, as the avoidance process, an execution of the program by the CPU is terminated, at least a part of the program data stored in the ROM is re-transferred to the RAM as in the transfer step, and operation of the CPU is resumed based on the program represented by the re-transferred program data as in the booting step.

21. The system boot method according to claim 19,
wherein, in the avoidance step, as the avoidance process, an execution of the program by the CPU is terminated, and a notification is made indicating that the access for writing a data in the storage area of the RAM is detected in the monitoring step.

* * * * *